(12) United States Patent
Kong et al.

(10) Patent No.: US 10,049,067 B2
(45) Date of Patent: Aug. 14, 2018

(54) CONTROLLER-PHY CONNECTION USING INTRA-CHIP SERDES

(71) Applicant: QUALCOMM Incorporated, San Diego, CA (US)

(72) Inventors: Xiaohua Kong, San Diego, CA (US); Deqiang Song, San Diego, CA (US); Zhi Zhu, San Diego, CA (US); Ohjoon Kwon, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 15/367,071

(22) Filed: Dec. 1, 2016

(65) Prior Publication Data

US 2018/0157609 A1   Jun. 7, 2018

(51) Int. Cl.
*G06F 13/38*   (2006.01)
*G06F 13/42*   (2006.01)
*G06F 3/14*   (2006.01)

(52) U.S. Cl.
CPC .............. *G06F 13/385* (2013.01); *G06F 3/14* (2013.01); *G06F 13/4282* (2013.01)

(58) Field of Classification Search
CPC .................................................. G06F 13/385
See application file for complete search history.

(56) References Cited

U.S. PATENT DOCUMENTS

| 6,452,927 | B1* | 9/2002 | Rich ................... H04L 12/5601 370/395.1 |
| 8,316,164 | B2 | 11/2012 | Siulinski et al. |
| 9,280,506 | B1 | 3/2016 | Mohanty et al. |
| 2005/0144331 | A1 | 6/2005 | Kim et al. |
| 2012/0062800 | A1 | 3/2012 | Sisto et al. |
| 2014/0004741 | A1* | 1/2014 | Jol ......................... H01R 29/00 439/620.01 |
| 2015/0304244 | A1* | 10/2015 | Johnson ................ H04L 7/0331 370/244 |
| 2016/0112711 | A1 | 4/2016 | Hundal et al. |

FOREIGN PATENT DOCUMENTS

WO   WO-2016112152 A1   7/2016

OTHER PUBLICATIONS

International Search Report and Written Opinion—PCT/US2017/060031—ISA/EPO—dated Jan. 25, 2018.

* cited by examiner

*Primary Examiner* — Farley Abad
(74) *Attorney, Agent, or Firm* — Haynes and Boone, LLP

(57) ABSTRACT

An on-chip passive transmission channel is provided for the propagation of serialized data from a first controller to a dual-protocol physical layer interface. A second controller for the dual-protocol physical layer interface is located closer on a semiconductor die to the dual-protocol physical layer interface than the first controller.

30 Claims, 6 Drawing Sheets

US 10,049,067 B2

CONTROLLER-PHY CONNECTION USING INTRA-CHIP SERDES

TECHNICAL FIELD

This application relates generally to the connection between a dual-standard physical layer (PHY) interface and the controllers for the dual standards.

BACKGROUND

A mobile device such as a smartphone or tablet typically requires an interface such as a Universal Serial Bus (USB) connector to couple to other devices. For example, the USB type-C connector has been widely adopted by the smartphone market. It is now conventional for a USB type-C connector to be the only external interface for such mobile devices. But mobile devices do not just drive other USB devices. For example, mobile devices are being used as video sources to drive displays and televisions with high-definition video such as supported by the DisplayPort protocol. The USB type-C connector must then support not only USB data traffic but also DisplayPort video data traffic.

An example mobile device 100 is shown in FIG. 1 in which a physical layer (PHY) interface 120 supports both the DisplayPort (DP) and the USB 3.0 (USB3) protocols. Since PHY interface 120 supports two protocols, it may also be denoted as a USB3-DP PHY interface 120. A multiplexer (not illustrated) in PHY interface 120 thus selects between incoming DP and USB3 data streams at an input port 125. These data streams are sourced by corresponding controllers. Each controller takes a certain amount of die space yet there is only so much die space adjacent input port 125. It may thus be the case that only one of these controllers can be adjacent to input port 125 on the die for USB3-DP PHY interface 120. In mobile device 100, it is a USB3 controller 130 that is adjacent to input port 125. In contrast, a DP controller 105 is located more remotely on the die from the input port 125.

Due to its remote location, the data stream from DP controller 105 to input port 125 for USB3-DP PHY interface 120 is pipelined using a plurality of sets of flip-flops 110. For example, the data stream from DP controller 105 may comprise a series of digital words (e.g., 60-bit digital words). Due to non-idealities in the transmission line that couples DP controller 105 to USB3-DP PHY interface 120, the individual bits in such relatively-wide digital words would become skewed relative to each other during the propagation from DP controller 105. Flip-flops 110 re-align the bits in the DP data words and thus address this skew. A physical coding sublayer (PCS) module 115 performs PCS processing on the DP data words from flip-flops 110 and presents the processed DP data words to input port 125. A serializer and transmitter (TX) within USB3-DP PHY interface 120 serializes and transmits the DP data words from PCS module 115 to an external receiver (not illustrated). Similarly, the serializer and transmitter within USB3-DP PHY interface 120 serializes and transmits USB data words from USB3 controller 130 as received through input port 125. Although USB3-DP PHY interface 120 eliminates the need for off-chip multiplexing of USB and DP data streams, flip-flops 110 consume considerable die space and power. Moreover, the pipelining through the sets of flip-flops 110 introduces latency.

Accordingly, there is a need in the art for denser and lower-power controller-PHY on-chip interfaces.

SUMMARY

To enhance density and data rates, an on-chip serializer/deserializer (SerDes) is provided for an a first semiconductor die including a dual-communication-protocol physical layer (PHY) interface. As implied by the name, the dual-communication-protocol PRY interface accommodates the physical layer interfacing between the first semiconductor die and additional semiconductor dies for two different communication protocols. Given the dominance of the Universal Serial Port (USB) standard as the external interface for mobile devices such as smartphones, the following discussion will be directed to embodiments in which a first one of the communication protocols is a Universal Serial Bus (USB) protocol. The second communication protocol may comprise a DisplayPort (DP) protocol. The dual-communication-protocol PHY interface may thus be denoted as a USB-DP PHY interface for such embodiments. However, it will be appreciated that other communication protocols such as high definition multi-media interface (HDMI) besides DisplayPort may be multiplexed through the dual-communication PHY interface.

The USB-DP PHY interface includes an input port for receiving a USB data stream from a USB controller and for receiving a DP data stream from a DP controller. In one embodiment, the USB controller is located on the first semiconductor die adjacent to the input port whereas the DP controller is located more remotely on the first semiconductor die from the input port. To accommodate the data propagation from the DP controller to the USB-DP PHY interface across the first semiconductor die, a DP serializer adjacent to the DP controller on the integrated circuit serializes the DP data words from the DP controller into a serialized DP data stream that propagates over an on-die passive transmission channel to the USB-DP PHY interface. The serialized DP data stream may then be de-serialized by a DP deserializer located between the passive transmission channel and the USB-DP PHY interface into DP data words (these DP data words may have the same width as provided by the DP controller or may have a different width). In such an embodiment, the USP-DP PHY interface includes a serializer-transmitter for re-serializing the DP data words. The serializer-transmitter would also serialize USB data words received from the USB controller.

Note that the design of the DP serializer and DP deserializer is simplified as compared to conventional SerDes architectures in that the integrated circuit designer has full control over the electrical properties of the passive transmission channel (which may also be denoted as a transmission line). For example, the on-chip transmission channel may comprise leads defined in one or more metal layers for the integrated circuit that are designed to have favorable electrical properties for data propagation (e.g., relatively low capacitance and inductance). In contrast, a traditional SerDes is used for interfacing with other integrated circuits over off-chip transmission lines that the integrated circuit designer has no control over. Traditional SerDes may thus require robust analog equalizers and related components. In contrast, the DP serializer and the DP deserializer may implement rudimentary or simplified equalization such that their design complexity is substantially eased as compared to the design of a traditional SerDes.

The use of a DP deserializer between the USB-DP PHY interface and the passive transmission line allows the integrated circuit designer to leverage existing USB-DP PHY interface architectures. However, such design re-use comes at the cost of deserializing the DP data stream in the DP deserializer and then reserializing the DP data stream within the USB-DP PHY interface. To relieve this double serialization issue, the passive transmission line may end instead in a DP receiver at the USB-DP PHY interface input port. The DP receiver detects the received serial DP data from the passive transmission line but does not deserialize the data. The USB-DP PI-1Y interface for such an embodiment comprises a transmitter. A USB serializer would then be necessary to serialize the USB data words from the USB controller prior to the provision of the resulting serialized USB data stream to the input port of the USB-DP PHY interface. Although the double serialization of the DP data stream is thereby eliminated, a conventional USB-DP PHY interface as discussed with regard to the flip-flop pipelining of the DP data words from the DP controller cannot be used since such a conventional USB-DP PHY interface includes a serializer. Accordingly, the elimination of the double serialization of the USB data stream comes at the cost of redesigning the USP-DP PHY interface.

Regardless of whether the USB-DP PHY interface includes a serializer or not, the use of the on-chip passive transmission channel eliminated the conventional need for pipelining the DP data stream through a series of flip-flops. Density and power consumption is thus improved with the use of the DP serializer, the passive on-chip transmission channel, and the optional DP deserializer.

These same advantages are provided by alternative embodiments in which the DP controller is located on the first semiconductor die so as to be adjacent the input port to the USB-DP PHY interface whereas the USB controller is located more remotely on the first semiconductor die from the input port. In such an alternative embodiment, a USB serializer serializes USB data words from the USB controller and propagates a resulting serialized USB data stream over a passive transmission channel to the input port. To leverage the use of conventional USB-DP PHY interfaces, the passive transmission channel may end in a USB deserializer that receives and deserializes the serialized USB data stream back into USB data words that are received by the input port. The USB-DP PHY interface would then reserialize the USB data words back into a serialized USB data stream for propagating over the USB port. Alternatively, the USB-DP PHY interface may be modified to just comprise a transmitter such that it does not include a serializer. The USB deserializer may then be omitted as the cost of introducing a DP serializer between the DP controller and the input port.

These and additional advantages may be better appreciated through the following detailed description.

BRIEF DESCRIPTION OF THE DRAWINGS

These aspects of the disclosure and their advantages are best understood by referring to the detailed description that follows. It should be appreciated that like reference numerals are used to identify like elements illustrated in one or more of the figures.

DETAILED DESCRIPTION

Figure 1:
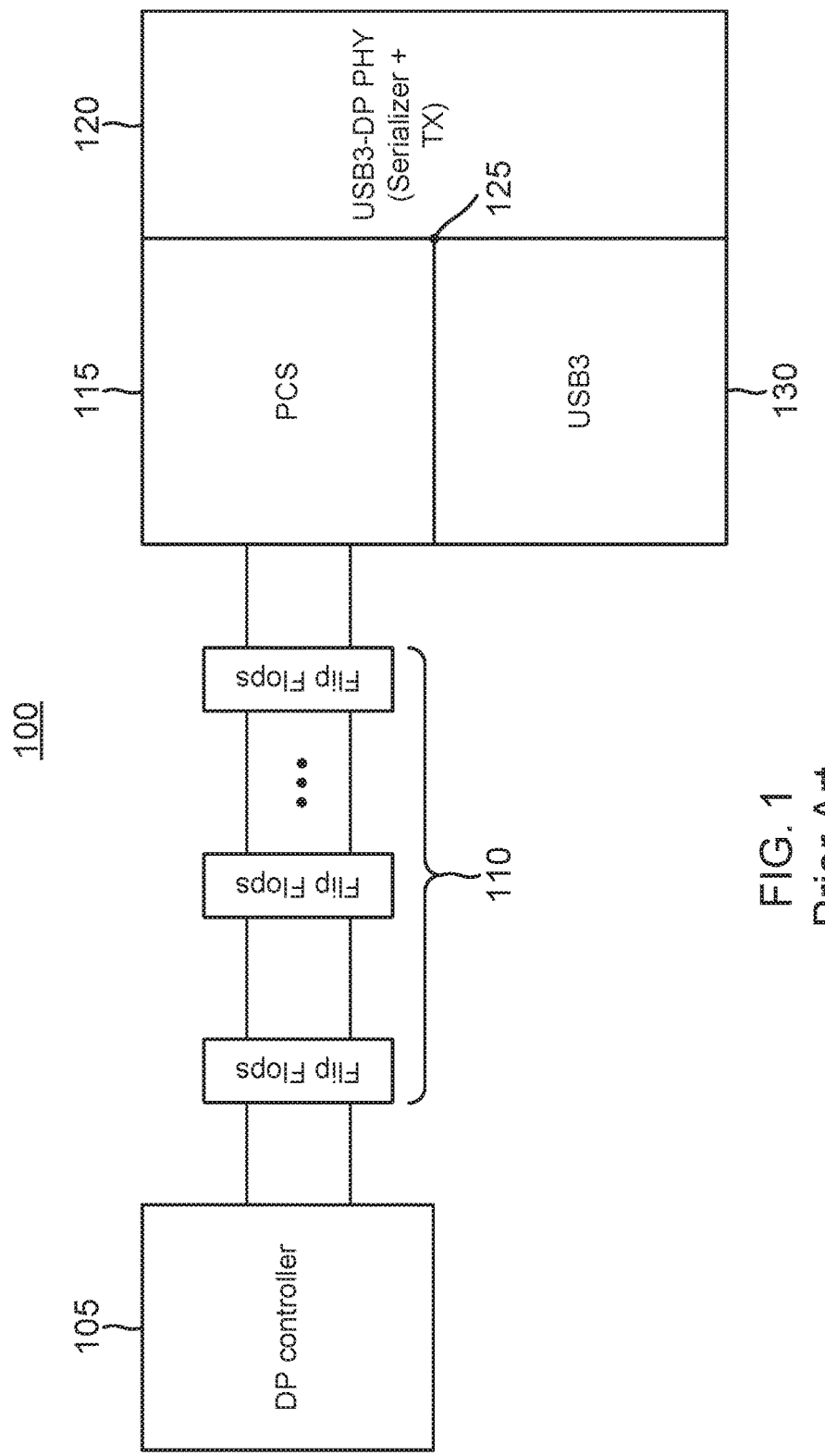
FIG. 1 is a diagram of a conventional system-on-a-chip (SoC) in which a USB-DP PHY interface couples to a DP controller through a flip-flop pipelined parallel (non-serialized) transmission channel.

A passive on-chip transmission channel is provided to couple a second communication protocol controller to a combination USB-second communication protocol physical layer (PHY) interface. The following discussion will be directed to embodiments in which the second communication protocol is a DisplayPort (DP) protocol but it will be appreciated that other communication protocols such as a high definition multimedia interface (HDMI) protocol may be substituted with the DP protocol. In addition, the following discussion will be directed to embodiments in which the USB protocol is a USB 3 (USB3) protocol but it will also be appreciated that other versions of the USB protocol may be used. Finally, the following discussion will further be directed to embodiments in which the passive transmission channel is included within a system-on-a-chip (SoC) but it will again be appreciated that other types of integrated circuits benefit from the density and power consumptions improvements provided by the passive on-chip transmission channel. Within the SoC, the dual-protocol USB3-DP PHY interface drives an external USB3 port with both USB and DP data streams. A system including the SoC such as a mobile device thus does not require off-chip multiplexing to receive the USB3 and DP data streams from the USB3 port.

The dual-protocol USB3-DP PHY interface includes an input port over which it receives a DP data stream from an on-chip DP controller as well as a USB data stream from an on-chip USB3 controller. As used herein, the term "input port" is defined to refer to a node over which both the DP data stream and USB data stream propagates. For example, a multiplexer may select between the DP data stream and the USB data stream to provide an output data stream to the USB3-DP PHY interface. The output of the multiplexer would thus comprise an "input port" as that term is used herein. With regard to this input port, note that it has a physical location on the semiconductor die for the SoC. Both the DP controller and the USB3 controller each requires a certain amount of die area for its instantiation on the semiconductor die. For example, should the DP controller be located physically adjacent the input port on the semiconductor die, it will occupy its corresponding amount of die area. It may be the case that the USB3 controller also cannot occupy this same die area and thus will be located more remotely from the input port on the semiconductor die. Only one of the two controllers may thus be physically adjacent the input port within the semiconductor die for the SoC. There are thus two main embodiments disclosed herein that depend upon which one of the controllers (DP or USB3) is the controller that is located adjacent the input port.

In USB3-controller-adjacent-the-input-port embodiments, the USB3 controller occupies the die space adjacent the USB3-DP PHY interface's input port so it is the DP controller that is instead further displaced from the input port on the SoC die. Note that the DP data rate is relatively high such as up to 32.4 Gigabits per second (Ggit/s). Even at lower data rates such as 21.6 Gbit/s, the transmission of such a high data rate using DP data words is subject to considerable skew that was conventionally addressed through pipelining using sets of flip-flops. The sets of flip-flops also address attenuation of the DP data words in that they regenerate the DP data words as well. For example, 160-bit-wide DP data words required multiple sets of 160 flip-flops each to repeatedly register the DP words to keep them aligned during the propagation from the DP controller to USB3-DP PHY interface. If the propagation distance between the DP controller and the USB3-DP PHY interface required 3 sets of flip-flops, the total number of flip-flops for a conventional 160-bit-wide DP word embodiment would comprise 3*160=480 flip-flops. But the passive transmission channel disclosed herein eliminates the need for so many flip-flops, which enhances density and decreases power consumption.

With regard to the serial transmission of a DP data stream from the DP controller over the passive transmission channel, the DP controller presents its DP data words to the passive transmission channel through a DP serializer. The DP serializer serializes the DP data words from the DP controller into a serialized DP data stream that propagates from a DP-controller-adjacent end of the passive transmission channel to a USB3-DP-PHY-interface-adjacent end of the passive transmission channel. The USB3-DP-PHY-interface-adjacent end of the passive transmission channel may couple to a DP deserializer that deserializes the serialized DP data stream back into DP data words. Such recovered DP data words may be of the same width as those driven from the DP controller or of a different width. To distinguish between these sets of DP data words, the DP data words from the DP controller are denoted herein as "first" DP data words whereas the DP data words from the DP deserializer are denoted herein as "second" DP data words. The combination of the DP serializer, the passive transmission channel, and the DP deserializer forms an on-chip serializer-deserializer (SerDes).

It was conventional for a USB3-DP PHY interface to include a serializer for serializing the DP and USB3 data streams from the respective DP and USB3 controllers. The use of an on-chip SerDes thus allows the circuit designer to use such conventional USB3-DP PHY interfaces. But it is inefficient to have to deserialize the serialized DP data stream in the DP deserializer and then re-serialize the second DP data words from the DP deserializer in the USB3-DP PHY interface. Accordingly, the input port for the USB3-DP PHY interface may couple to the passive transmission channel through a DP receiver instead of a DP deserializer. The DP receiver recovers the serialized DP data stream (and possibly retimes the data as well) from the passive transmission channel so that the resulting recovered serialized DP data stream may be driven into the input port for the USB3-DP PHY interface. The combination of the DP serializer, the passive transmission channel, and the DP receiver forms an on-chip serializer. USB3-controller-adjacent-the-input-port embodiments may thus be sub-divided into on-chip SerDes embodiments and on-chip serializer embodiments. The USB3-DP PHY interface for the on-chip serializer embodiments would function only as a transmitter in that it would not serialize the data streams from the input port. In both embodiments, the USB3-DP PHY interface drives an external USB3 port with a serialized stream of DP data. To distinguish this stream from the serialized DP data carried on the passive transmission channel, the serialized DP data stream from the DP serializer is denoted herein as a first serialized DP data stream whereas the serialized DP data stream driven through the external USB3 port is denoted herein as a second serialized DP data stream. Since the USB3-DP PHY interface for the on-chip SerDes embodiments includes a serializer as well as a transmitter, it is denoted herein as a "combo" USB3-DP PHY interface. In contrast, the PRY interface for the on-chip serializer embodiments is denoted herein as a USB3-DP PHY interface without any further qualification.

Note that the same considerations apply in DP-controller-adjacent-the-input-port embodiments. Such embodiments may thus be sub-divided into on-chip SerDes embodiments and on-chip serializer embodiments. In other words, the serialized USB data stream after propagation over the passive transmission channel from the remotely-located USB3 controller may be deserialized by a USB3 deserializer and then re-serialized in a combo USB3-DP PHY interface. Alternatively, the serialized USB data stream may instead be driven directly into the input port of a USB3-DP PRY interface by a USB3 receiver. Some example on-chip SerDes embodiments will be discussed initially followed by a discussion of some example on-chip serializer embodiments.

Combo USB3-DP PHY with On-Chip SerDes

Figure 2A:
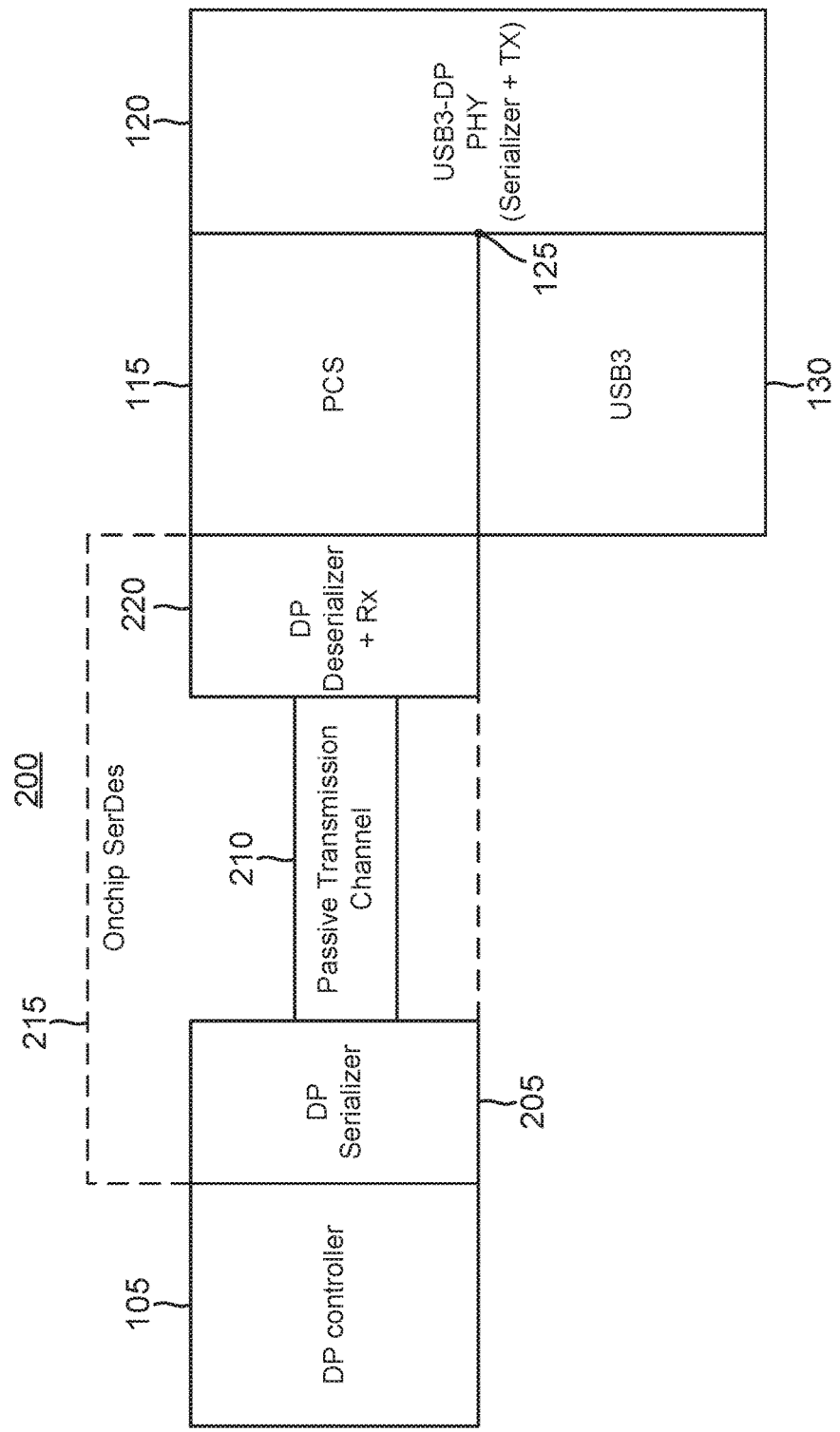
FIG. 2A is a diagram of an SoC in which a USB-DP PHY interface couples to a DP controller through a SerDes on-chip transmission channel in accordance with an aspect of the disclosure.

A USB3-controller-adjacent-the-input-port embodiment will be discussed first followed by a discussion of a DP-controller-adjacent-the-input-port embodiment. An SoC 200 is shown in FIG. 2A in which a DP deserializer 220 deserializes a first serialized DP data stream received from a passive transmission channel 210. Since DP deserializer 220 also functions to receive the first serialized DP data stream, it is denoted in FIG. 2A as a DP deserializer and receiver (RX) 220. A DP controller 105 drives a first end of passive transmission channel 210 through a DP serializer 205. In particular, DP controller 105 provides a series of first DP data words that DP serializer 205 serializes into a first serialized DP data stream that is driven onto passive transmission channel 210. The length of passive transmission channel 210 may range from a fraction of a millimeter to several millimeters. DP controller 105 is thus displaced from input port 125 on the semiconductor die by at least the length of passive transmission channel 210. DP deserializer 220 deserializes the first serialized DP data stream into a series of second DP data words. After physical coding sublayer (PCS) processing by a PCS circuit 115, the resulting PCS-coded series of second DP data words are received by combo USB3-DP PHY interface 120 at input port 125. As known in the networking arts, PCS processing includes data encoding and decoding and related functions in the physical layer of the open systems interconnection (OSI) reference model. DP serializer 205, passive transmission channel 210, and DP deserializer 220 function as an on-chip SerDes 215 for coupling DP controller 105 to PCS circuit 115 and ultimately to input port 125. Since transmission channel 210 is passive, on-chip SerDes 215 obviates the need for pipelining DP data words from the remotely-located DP controller 105 through sets of flip-flops as discussed with regard to SoC 100 of FIG. 1.

In contrast to DP controller 105, a USB3 controller 130 is located physically adjacent to input port 125 on the semiconductor die for SoC 200 such that USB3 controller 130 may drive input port 125 with a plurality of PCS-coded USB3 data words. A PCS circuit (not illustrated) is thus integrated with USB3 controller 130 for providing the PCS processing of the USB3 data words.

Figure 2B:
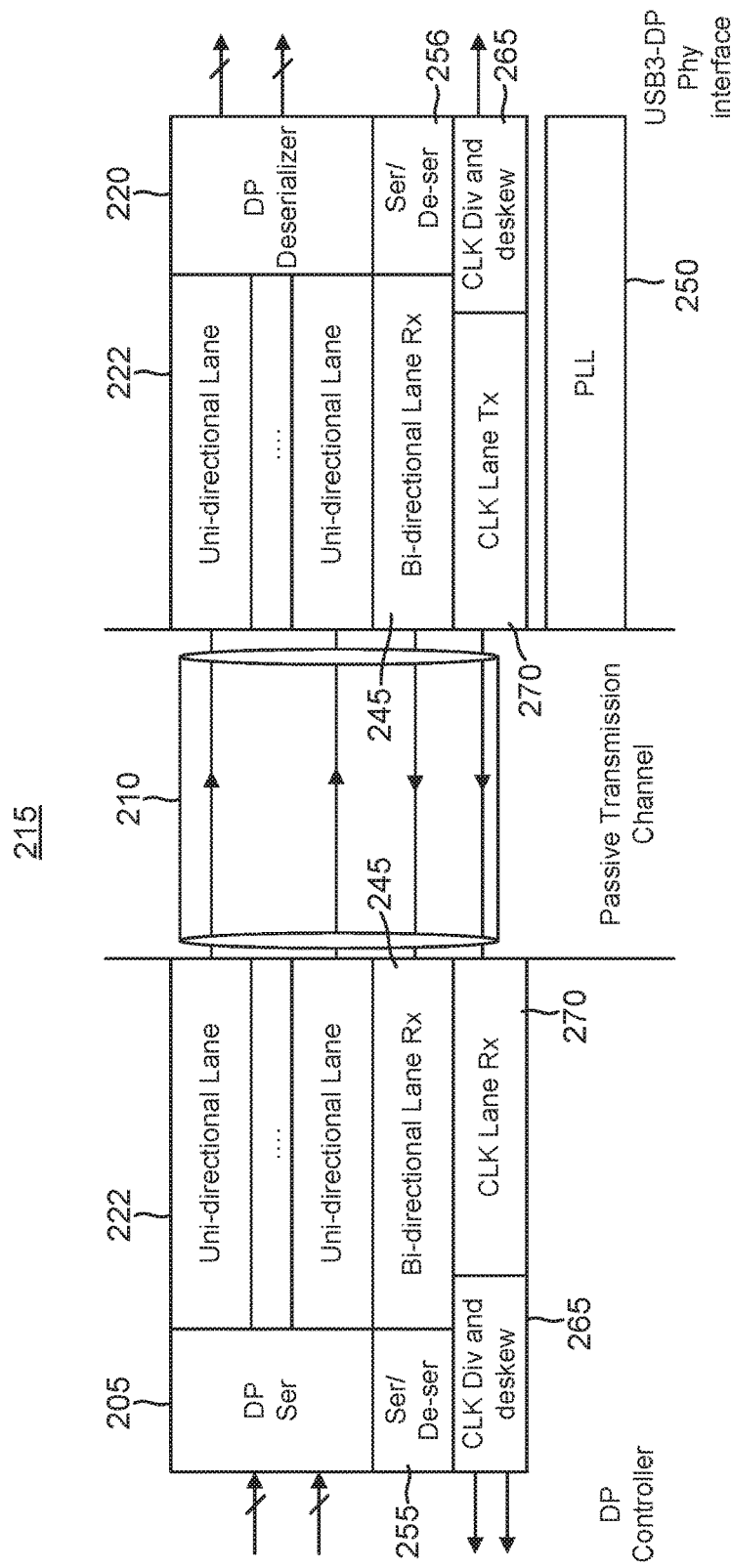
FIG. 2B is a diagram of the on-chip transmission channel of FIG. 2A and the corresponding DP serializer and DP deserializer in accordance with an aspect of the disclosure.

Additional details for on-chip SerDes 215 are shown in FIG. 2B. The first serialized data stream from DP serializer 205 may be divided into a plurality of first serialized data streams each having its own unidirectional lane 222 in passive transmission channel 210. For example, each unidirectional lane 222 may comprise a lead or wire formed in a metal layer adjacent to the semiconductor die for SoC 200 (FIG. 2A) for single-ended signaling embodiments. If the serialized data streams are differential, each unidirectional lane 222 may comprise a pair of wires formed in a metal layer. In contrast to SoC 100, there are only a relatively small number (e.g., eight) of such first serialized data streams such that the dangers of skew is abated. DP deserializer 220 deserializes the plurality of first serialized data streams received over unidirectional lanes 221 into the series of second DP data words presented to combo USB3-DP PHY interface 120 (FIG. 2A). To enable a bi-directional data flow between combo USB3-DP PHY interface 120 and DP controller 105, passive transmission channel 210 includes at least one bi-directional lane 245. A first serializer/deserializer 255 drives bi-directional lane 245 for DP controller 105 whereas a second serializer/deserializer 256 drives bi-directional lane 245 for USB3-DP PHY interface 120.

A clock source such as a phase-locked loop (PLL) 250 adjacent DP serializer 220 provides a clock for the DP serializer 205 that is transmitted over a clock lane 270. DP controller 105 and USB3-DP PHY interface 120 each has its own clock divider and de-skew circuit 265 for frequency dividing and de-skewing the clock from PLL 250.

Figure 2C:
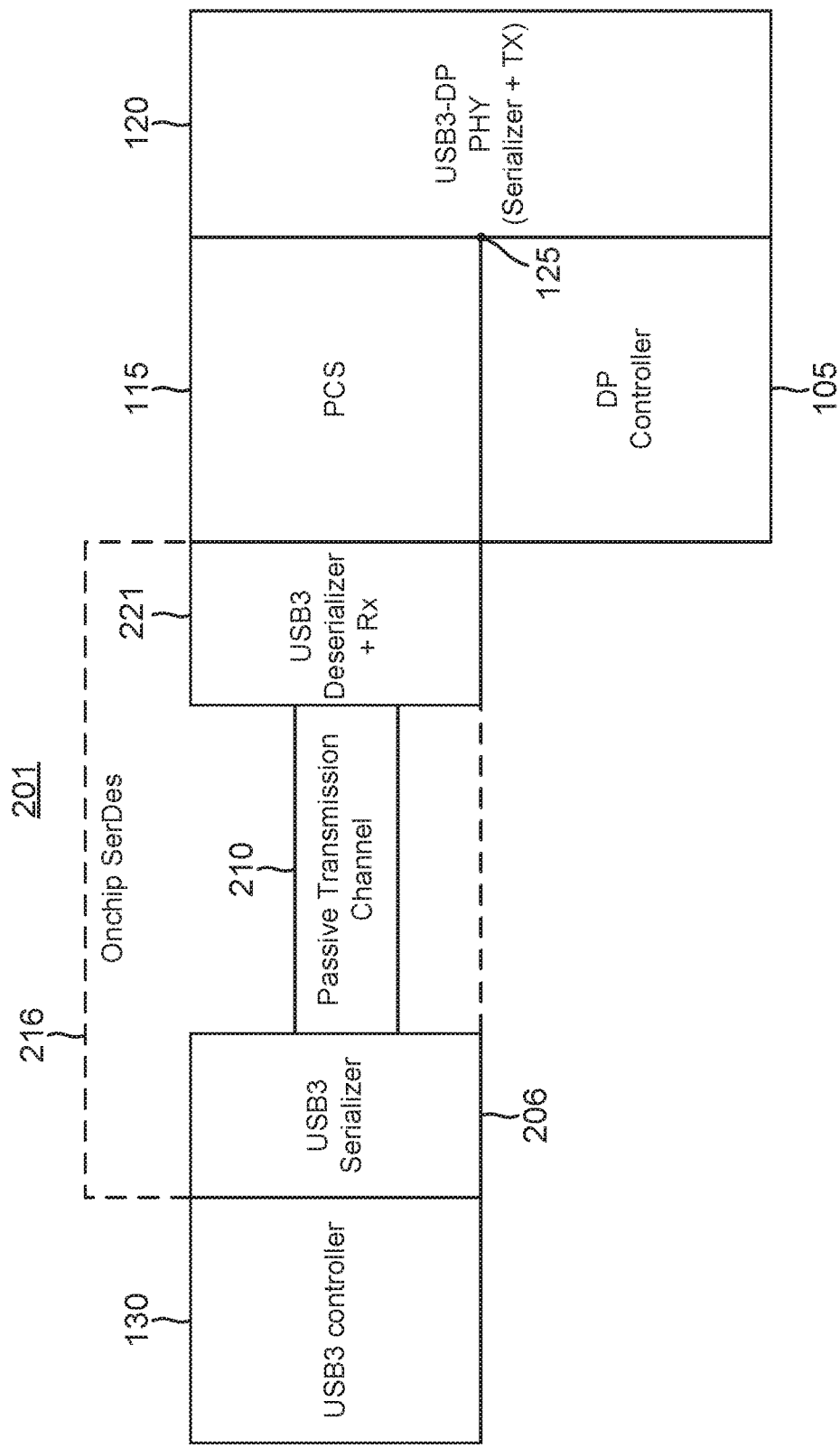
FIG. 2C is a diagram of an SoC in which a USB-DP PHY interface couples to a USB controller through a SerDes on-chip transmission channel in accordance with an aspect of the disclosure.

A DP-controller-adjacent-the-input-port on-chip SerDes embodiment is formed analogously as discussed with regard to SoC 200. An example SoC 201 is shown in FIG. 2C in which USB3 controller 130 is located remotely on the semiconductor die for SoC 200 from input port 125. In contrast, DP controller 105 is located adjacent input port 125. USB3 controller 130 drives USB data words to a USB3 serializer 206 to produce a first serialized USB data stream for propagation on passive transmission channel 210. A USB3 receiver and deserializer 222 receives and deserializes the first serialized USB data stream into corresponding USB data words that are PCS processed in PCS circuit 115 before propagating over input port 125 to combo USB3-DP PHY interface 120. USB3 serializer 206, passive transmission channel 210, and USB3 deserializer 221 function as an on-chip SerDes 216 for coupling USB3 controller 130 to PCS circuit 115 and ultimately to input port 125. SerDes 216 may be constructed analogously as discussed with regard to SerDes 215. DP controller 105 drives DP words into input port 125. Combo USB3-DP PHY 120 functions in a conventional fashion to serialize the USB words and DP words received over input port 125 into corresponding serialized USB data streams and DP data streams for transmission to an external die (not illustrated) over a USB port. Some example on-chip serializer embodiments will now be discussed.

USB3-DP PHY Interface with an On-Chip Serializer

Figure 3:
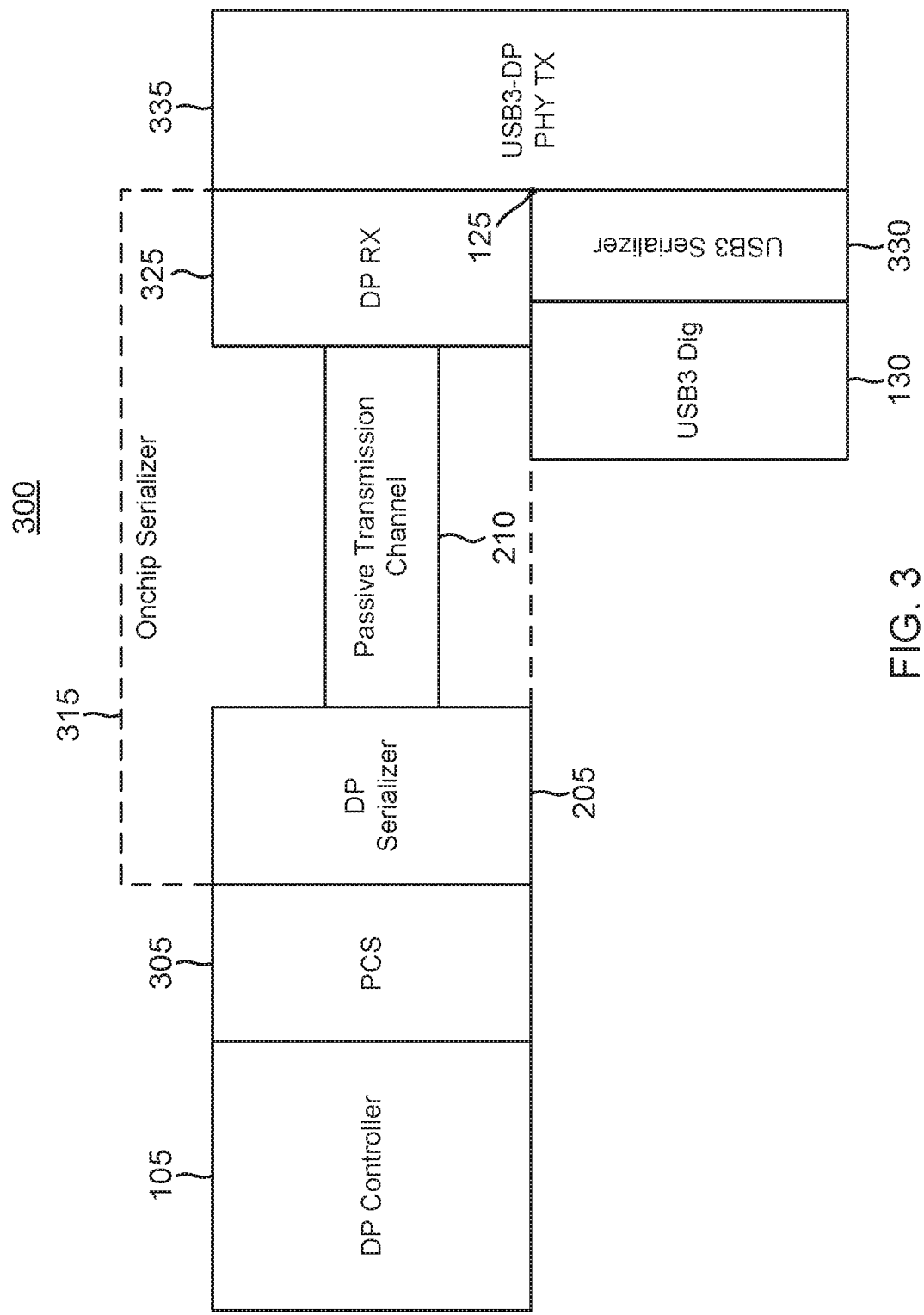
FIG. 3 is a diagram of an SoC in which a USB-DP PHY interface couples to a DP controller through a serialized on-chip transmission channel in accordance with an aspect of the disclosure.
Figure 4:
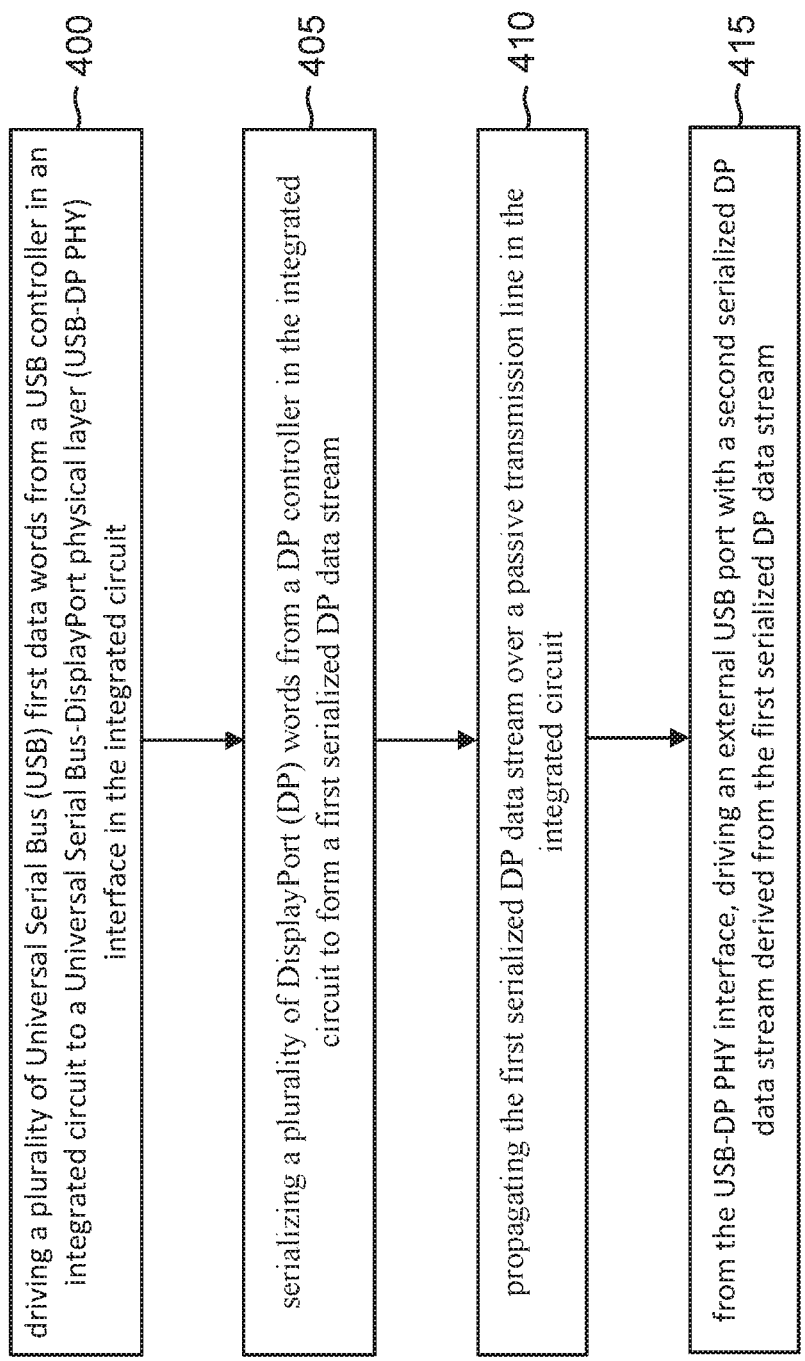
FIG. 4 is a flowchart for a method of interfacing a DP controller to a USB-DP PHY interface using a serialized DP data stream.

Both USB3-controller-adjacent-the-input-port embodiments and DP-controller-adjacent-the-input-port embodiments may include an on-chip serializer as opposed to an on-chip SerDes to eliminate the repeated serialization and deserialization of the data words remotely-located controller. An example USB3-controller-adjacent-the-input-port embodiment will be discussed first. In particular, DP deserializer 220 in SoC 200 may be replaced be a DP receiver (RX) 325 as shown for an SoC 300 in FIG. 3. DP receiver 325 functions to detect the first serialized DP data streams from passive transmission channel 210 but only receives and does not deserialize these streams. To further simplify the architecture, PCS circuit 115 may be replaced with a PCS circuit 305 that PCS processes the first DP data words from DP controller 105. PCS circuit 305 intervenes between DP serializer 205 and DP controller 105 such that the first serialized DP data streams from DP serializer 205 are PCS processed. DP serializer 205, passive transmission channel 210, and DP receiver 325 form an on-chip serializer 315. On-chip serializer 315 (as well as on-chip SerDes 215) may be deemed to form a means for serializing the plurality of first DP data words into a first serialized DP data stream and for passively propagating the first serialized DP data stream across the integrated circuit from the DP controller towards the USB-DP PHY interface.

DP receiver 325 drives the first serialized DP data streams through input port 125 as a single serialized DP data stream. Combo USB3-DP PHY interface 120 of FIG. 2A is thus replaced by a USB3-DP PHY interface 335 that does not include a serializer. Instead, USB3-DP PHY interface 335 functions merely as a transmitter (TX) to drive the serialized DP data stream over the external USB3 port (not illustrated). Since USB3 controller 130 functions as discussed earlier to source a plurality of USB data words, a USB3 serializer 330 intervenes between USB3 controller 130 and input port 125 for USB3-DP PHY interface 335. USB3 serializer 330 would also function to perform the desired PCS processing of the serialized USB3 data stream. Although SoC 300 thus eliminates the repeated serialization of the DP data stream, it requires the redesign of USB3-DP PHY interface 120 into transmitter-only USB3-DP PHY interface 335.

It will be readily appreciated by those of ordinary skill in the art that SoC 300 may be readily modified into a DP-controller-adjacent-the-input-port embodiment. In that case, DP controller 105 would be replaced by USB controller 120, and vice versa. DP serializer 205 would be replaced by a USB3 serializer that drives passive transmission channel 210 with a serialized USB data stream. Similarly, USB3 serializer 330 would be replaced by a DP serializer. Finally, DP receiver 325 would be replaced by a USB3 receiver that functions to receive the serialized USB data stream(s) from passive transmission channel 210 but does not deserialize them.

A method of using the passive transmission channel 210 of SoC 200 and SoC 300 will now be discussed. The method includes an act 400 of driving a plurality of Universal Serial Bus (USB) first data words from a USB controller in an integrated circuit to a Universal Serial Bus-DisplayPort physical layer (USB-DP PHY) interface in the integrated circuit. The transmission of the first data words from DP controller 105 in either SoC 200 or SoC 300 is an example of act 400.

The method also includes an act 405 of serializing a plurality of DisplayPort (DP) words from a DP controller in the integrated circuit to form a first serialized DP data stream. The serialization by DP serializer 205 in either SoC 200 or SoC 300 is an example of act 405.

In addition, the method includes an act 410 of propagating the first serialized DP data stream over a passive transmission channel in the integrated circuit. The propagation of the first serialized DP data streams over passive transmission channel 210 in either SoC 200 or SoC 300 is an example of act 410.

Finally, the method includes an act 415 of, from the USB-DP PHY interface, driving an external USB port with a second serialized DP data stream derived from the first serialized DP data stream. Such derivation from the first serialized DP data stream may include a deserialization and subsequent serialization as discussed for SoC 200. Alternatively, the first and second serialized DP data stream may be the same as discussed for SoC 300.

As those of some skill in this art will by now appreciate and depending on the particular application at hand, many modifications, substitutions and variations can be made in and to the materials, apparatus, configurations and methods of use of the devices of the present disclosure without departing from the scope thereof. For example, passive transmission channel 210 may be replaced by an active transmission channel that includes at least one flip flop for each uni-directional lane and bi-directional lane. Although the flip flops would decrease density, their inclusion would boost the amplitude of the serial data stream, albeit at the cost of increase latency. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. An integrated circuit, comprising:
   a Universal Serial Bus-DisplayPort physical layer (USB-DP PHY) interface including an input port;
   a USB controller configured to provide a plurality of USB data words to the input port;
   a DisplayPort (DP) controller configured to provide a plurality of first DP data words;
   a passive transmission channel: and
   a DP serializer configured to serialize the plurality of first DP data words into a first serialized DP data stream and to drive the first serialized DP data stream over the passive transmission channel, wherein the USB-DP PHY interface is configured to drive an external USB port with a second serialized DP data stream derived from the first serialized DP data stream and to drive the external USB port with a serialized USB data stream derived from the plurality of USB data words.

2. The integrated circuit of claim 1, further comprising:
   a DP deserializer configured to deserialize the first serialized DP data stream into a plurality of second DP data words; and
   a physical coding sublayer (PCS) circuit configured to PCS process the second DP data words into a plurality of PCS-processed DP data words and to drive the PCS-processed DP data words to the USB-DP PHY interface.

3. The integrated circuit of claim 2, wherein the USB-DP PHY interface includes a serializer configured to serialize the PCS-processed DP data words into the second serialized DP data stream.

4. The integrated circuit of claim 1, wherein the USB-DP PHY interface is a Universal Serial Bus 3 (USB3)-DP PHY interface, and wherein the USB controller is a USB3 controller.

5. The integrated circuit of claim 1, wherein the DP serializer is further configured to serialize the plurality of first DP data words such that the first serialized DP data stream comprises a plurality of first serialized DP data streams, and wherein the passive transmission channel includes a plurality of uni-directional lanes corresponding to the plurality of first serialized DP data streams, wherein the DP serializer is further configured to drive each first serialized DP data stream onto its corresponding uni-directional lane in the passive transmission channel.

6. The integrated circuit of claim 5, wherein each uni-directional lane comprises a at least one trace in a metal layer of the integrated circuit.

7. The integrated circuit of claim 1, wherein the passive transmission channel includes a clock channel, the integrated circuit further comprising a clock source configured to drive a clock through the clock channel to the DP controller, and wherein the DP serializer is further configured to serialize the plurality of first DP data words responsive to the clock.

8. The integrated circuit of claim 7, wherein the clock source comprises a phase-locked loop.

9. The integrated circuit of claim 1, further comprising:
   a DP receiver configured to receive the first serialized DP data stream from the passive transmission channel and drive the first serialized DP data stream to the USB-DP PHY interface, and wherein the USB-DP PHY interface is configured to transmit the first serialized DP data stream through the external USB port as the second serialized DP data stream.

10. The integrated circuit of claim 9, further comprising a DP physical coding sublayer (PCS) circuit configured to PCS process the plurality of first DP data words into a plurality of PCS-processed first DP data words, and wherein the DP serializer is configured to serialize the plurality of PCS-processed first DP data words to form the first serialized DP data stream.

11. The integrated circuit of claim 9, further comprising:
    a USB serializer configured to serialize the plurality of USB data words into the serialized USB data stream.

12. The integrated circuit of claim 11, further comprising a USB physical coding sublayer (PCS) circuit configured to process the plurality of USB data words into a plurality of PCS-processed USB data words, and wherein the USB serializer is configured to serialize the plurality of PSC-processed USB data words into the serialized USB data stream.

13. The integrated circuit of claim 1, wherein the USB controller is adjacent an input port for the USB-DP PHY interface on a semiconductor die on which the integrated circuit is implemented.

14. The integrated circuit of claim 11, wherein the DP controller is displaced on the semiconductor die from the input port.

15. A method, comprising:
    driving a plurality of Universal Serial Bus (USB) first data words from a USB controller in an integrated circuit to a Universal Serial Bus-DisplayPort physical layer (USB-DP PHY) interface in the integrated circuit;
    serializing a plurality of DisplayPort (DP) words from a DP controller in the integrated circuit to form a first serialized DP data stream;
    propagating the first serialized DP data stream over a passive transmission channel in the integrated circuit; and
    from the USB-DP PHY interface, driving an external USB port for the integrated circuit with a second serialized DP data stream derived from the first serialized DP data stream.

16. The method of claim 15, further comprising:
    deserializing the first serialized DP data stream to form a plurality of second DP data words; and
    serializing the plurality of second DP data words in the USB-DP PHY interface to form the second serialized DP data stream.

17. The method of claim 15, further comprising: receiving the first serialized DP data stream from the passive transmission channel to form a received first serialized DP data stream and driving the USB-DP PHY interface with the received first serialized DP data stream to form the second serialized DP data stream.

18. An integrated circuit, comprising:
a DisplayPort (DP) controller configured to provide a plurality of first DP data words;
a USB controller configured to provide a plurality of USB data words;
a USB-DP physical layer (PHY) interface configured to drive a USB port with a serialized stream of USB data derived from the plurality of USB data words, wherein the DP controller is located more remotely on a semiconductor die for the integrated circuit from the USB-DP PHY interface as compared to the USB controller; and
means for serializing the plurality of first DP data words into a first serialized DP data stream and for passively propagating the first serialized DP data stream across the integrated circuit from the DP controller towards the USB-DP PHY interface, wherein the USB-DP PHY interface is further configured to drive the USB port with a second serialized DP data stream derived from the first serialized DP data stream.

19. The integrated circuit of claim 18, wherein the USB controller comprises a Universal Serial Bus 3 (USB3) controller, and wherein the USB-DP PHY interface comprises a USB3-DP PHY interface.

20. The integrated circuit of claim 19, wherein the USB-DP PHY interface is configured to receive the first serialized DP data stream from the means and to transmit the first serialized DP data stream over the USB port as the second serialized DP data stream.

21. An integrated circuit, comprising:
a Universal Serial Bus-DisplayPort physical layer (USB-DP PHY) interface including an input port;
a DisplayPort (DP) controller configured to provide a plurality of DP data words to the input port;
a Universal Serial Bus (USB) controller configured to provide a plurality of first USB data words;
a passive transmission channel: and
a USB serializer configured to serialize the plurality of first USB data words into a first serialized USB data stream and to drive the first serialized USB data stream over the passive transmission channel, wherein the USB-DP PHY interface is configured to drive an external USB port with a second serialized USB data stream derived from the first serialized USB data stream and to drive the external USB port with a serialized DP data stream derived from the plurality of DP data words.

22. The integrated circuit of claim 21, further comprising:
a USB deserializer configured to deserialize the first serialized USB data stream into a plurality of second USB data words; and
a physical coding sublayer (PCS) circuit configured to PCS process the second USB data words into a plurality of PCS-processed USB data words and to drive the PCS-processed USB data words to the USB-DP PHY interface.

23. The integrated circuit of claim 22, wherein the USB-DP PHY interface includes a serializer configured to serialize the PCS-processed USB data words into the second serialized USB data stream.

24. The integrated circuit of claim 21, wherein the USB-DP PHY interface is a Universal Serial Bus 3 (USB3)-DP PHY interface, and wherein the USB controller is a USB3 controller.

25. The integrated circuit of claim 21, wherein the USB serializer is further configured to serialize the plurality of first USB data words such that the first serialized USB data stream comprises a plurality of first serialized SUB data streams, and wherein the passive transmission channel includes a plurality of uni-directional lanes corresponding to the plurality of first serialized USB data streams, wherein the USB serializer is further configured to drive each first serialized USB data stream onto its corresponding uni-directional lane in the passive transmission channel.

26. The integrated circuit of claim 21, wherein the passive transmission channel includes a clock channel, the integrated circuit further comprising a clock source configured to drive a clock through the clock channel to the USB controller, and wherein the USB serializer is further configured to serialize the plurality of first USB data words responsive to the clock.

27. The integrated circuit of claim 26, wherein the clock source comprises a phase-locked loop.

28. The integrated circuit of claim 21, further comprising:
a USB receiver configured to receive the first serialized USB data stream from the passive transmission channel and drive the first serialized USB data stream to the USB-DP PITY interface, and wherein the USB-DP PHY interface is configured to transmit the first serialized USB data stream through the external USB port as the second serialized USB data stream.

29. The integrated circuit of claim 28, further comprising a DP physical coding sublayer (PCS) circuit configured to PCS process the plurality of first USB data words into a plurality of PCS-processed first USB data words, and wherein the USB serializer is configured to serialize the plurality of PCS-processed first USB data words to form the first serialized USB data stream.

30. The integrated circuit of claim 28, further comprising:
a DP serializer configured to serialize the plurality of DP data words into the serialized DP data stream.

* * * * *